United States Patent Office 2,776,151
Patented Jan. 1, 1957

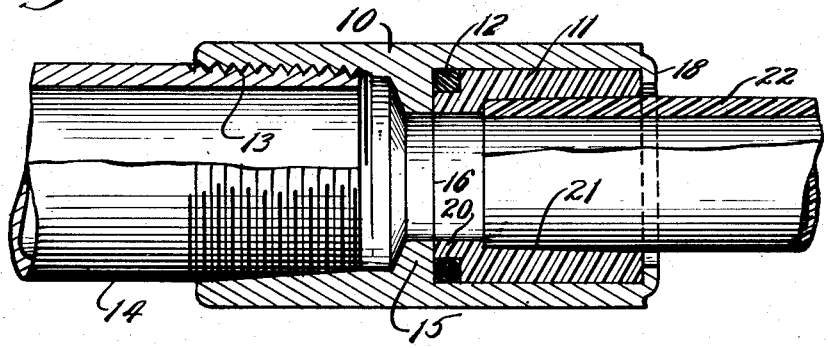
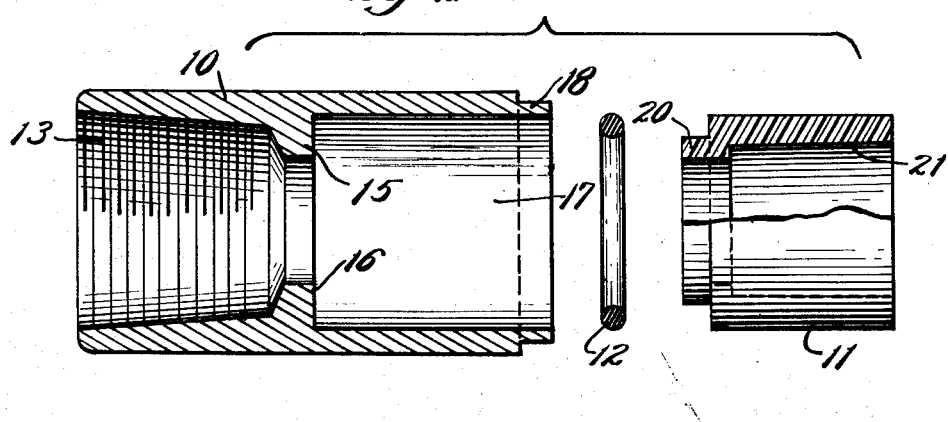
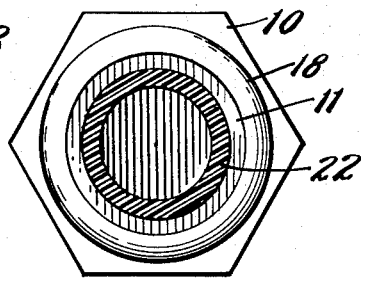

2,776,151

PIPE FITTING FOR CONNECTING METAL PIPE TO PLASTIC PIPE

Robert J. Harkenrider, Winona, Minn., assignor, by mesne assignments, to Continental Can Company, Inc., New York, N. Y., a corporation of New York Application August 19, 1952, Serial No. 305,235

1 Claim. (Cl. 285—174)

This invention relates to pipe fittings, and has for its principal object to provide fittings for joining plastic pipe to metal pipe.

In the preferred embodiment of the invention here illustrated:

Fig. 1 is a longitudinal section through the fitting and associated pieces of pipe;

Fig. 2 is a similar view with the parts of the fitting displaced; and

Fig. 3 is an end view of the fitting looking from the right in Fig. 1.

But these diagrammatic drawings are used for the purpose of disclosure only, and are not intended to impose unnecessary limitations on the claim.

The fitting includes a case or sleeve 10 of metal, an adapter 11 of plastic, and a gasket 12 of elastic material. The case 10 has female IPS threads 13 (male threads could be used) to receive the threaded end 14 of the metal pipe.

About the middle of the case 10 there is a defining wall 15 providing a shoulder 16, which forms the inner limit of a chamber 17 for the plastic adapter 11.

At the right end, the case 10 is provided with a flange 18, which is crimped or spun over in the assembled fitting as shown in Fig. 1 to make the adapter fast.

The inner end of the adapter is provided with a flange 20 for cooperation with the shoulder 16 to limit the compression on the gasket 12.

The gasket is made of rubber or rubber-like composition with sufficient elasticity to allow distortion when the adapter is pushed to the position shown in Fig. 1.

That distortion changes the otherwise circular cross-section of the gasket to provide the appropriate seal. Such gaskets are on the market under the name "O" Ring, made by Precision Rubber Products Corporation, Dayton, Ohio.

The plastic adapter 11 has a tapered and shouldered socket 21 to receive the plastic pipe 22, which is made fast therein by applying a solvent to the contacting surfaces and pressing the pipe home.

The device is very simple and lends itself to production in quantity at low cost.

The term "plastic" is used herein to designate that great line of organic plastics including synthetic resins, cellulose derivatives, natural resins, and protein matter, and which may be illustrated by cellulose acetate butyrate, polystyrene, methyl methacrylate, and vinyl chloride.

I claim:

In a fitting for connecting the threaded end of a metal pipe to an end of a plastic pipe including a metal sleeve having one end thereof threaded to receive the end of the metal pipe, the improvement which comprises, an open ended chamber integral with the other end of said sleeve, a radial internal shoulder integral with said sleeve substantially intermediate its length and separating said threaded end and said chamber end of said sleeve, a tubular plastic insert fixed within said chamber, a tapered shouldered socket formed in said insert to receive the end of the plastic pipe, an inwardly extending flange provided at the inwardly extending end of said insert and in contact with said shoulder, a peripheral groove surrounding said inwardly extending flange and facing said shoulder, a compressible sealing gasket seated in said groove and in sealing engagement with said shoulder, the compression on said gasket being limited by the contact between said flange and shoulder, and an outwardly extending flange integral with the outer end of said chamber and adapted to be turned radially inwardly against the outer end of said insert whereby to hold said insert in said chamber and to compress said sealing gasket against said shoulder.

References Cited in the file of this patent
UNITED STATES PATENTS

| | | |
|---|---|---|
| 2,269,659 | Glowaski | Jan. 13, 1942 |
| 2,270,926 | Briegal et al. | Jan. 27, 1942 |
| 2,315,729 | Hoss | Apr. 6, 1943 |
| 2,366,067 | Smith | Dec. 26, 1944 |
| 2,437,843 | Van Ness | Mar. 16, 1948 |
| 2,492,006 | Raybould | Dec. 20, 1949 |
| 2,498,831 | Veitch | Feb. 28, 1950 |
| 2,596,020 | Fletcher | May 6, 1952 |
| 2,703,720 | Warren | Mar. 8, 1955 |

FOREIGN PATENTS

| | | |
|---|---|---|
| 71,641 | Sweden | Apr. 21, 1931 |